United States Patent [19]

Yoneshige

[11] Patent Number: 5,204,044
[45] Date of Patent: Apr. 20, 1993

[54] METHOD OF ASEMBLING A DC SOLENOID WITH A THERMISTOR

[75] Inventor: Kazuhiro Yoneshige, Nagoya, Japan

[73] Assignee: Aisan Kogyo Kabushiki Kaisha, Ohbu, Japan

[21] Appl. No.: 662,998

[22] Filed: Feb. 28, 1991

Related U.S. Application Data

[62] Division of Ser. No. 488,662, Feb. 28, 1990, abandoned.

[30] Foreign Application Priority Data

Mar. 28, 1989 [JP] Japan ............................ 1-036226[U]

[51] Int. Cl.⁵ .................................................. B29C 0/0
[52] U.S. Cl. ............................ 264/272.15; 264/272.18; 335/278
[58] Field of Search ........................ 335/278, 299, 300; 336/90, 96, 30; 361/161, 165; 29/602.1, 612, 613, 618, 619; 338/22 R, 23; 264/272.13, 272.14, 272.15, 272.18, 272.19, 272.11

[56] References Cited

U.S. PATENT DOCUMENTS

| | | | |
|---|---|---|---|
| 3,912,117 | 11/1975 | Blaha | 361/27 |
| 4,104,509 | 8/1978 | Van Bokestal | 338/22 R |
| 4,222,024 | 9/1980 | Ekowicki | 338/22 R |
| 4,752,762 | 6/1988 | Inano et al. | 338/22 R |
| 4,822,980 | 4/1989 | Carbone et al. | 338/22 R |
| 4,841,274 | 6/1989 | Yagher et al. | 338/22 R |
| 4,934,831 | 6/1990 | Volbrecht | 338/22 R |

FOREIGN PATENT DOCUMENTS

59-107108 7/1984 Japan .

Primary Examiner—Leo P. Picard
Assistant Examiner—Raymond Barrera
Attorney, Agent, or Firm—Cushman, Darby & Cushman

[57] ABSTRACT

Method of assembling a DC solenoid comprising: a coil; a thermistor connected in series to the coil and having a positive temperature coefficient; a pressure-resistant case for housing the thermistor; and a synthetic resin material for sealing the pressure-resistant case and the coil integrally.

4 Claims, 2 Drawing Sheets

METHOD OF ASEMBLING A DC SOLENOID WITH A THERMISTOR

This is a division of application Ser. No. 07/488,662, filed on Feb. 28, 1990, now abandoned.

BACKGROUND OF THE INVENTION

The present invention relates to a DC solenoid suitable for use with a solenoid valve and the like requiring water- and explosion-proofness.

A type of DC solenoid disclosed in JP-A(U)-59-107108 is such that as shown in FIG. 1 a thermistor 2 having a positive temperature coefficient is connected in series to a coil 1 for attracting a plunger and is also connected to a DC power supply through a main switch 3.

This thermistor 2 has such a characteristic that the resistance value thereof increases sharply with temperature in a range higher than a predetermined level. For this reason, although the resistance value of the thermistor 2 is small with a large current flowing in the coil 1 at the time of starting the operation, the temperature of the thermistor 2 increases by self-heating and ambient temperature with the lapse of time and the resistance value thereof increases greatly, thus sharply reducing the current flowing in the coil 1.

If the diameter and the winding specification of the copper wire used for the coil or the characteristic of the thermistor 2 is appropriately set, a large magnetic force is generated at the time of starting the operation and the heat generation of the coil is dampened after starting the operation, so that the coil is prevented from burning while at the same time securing a predetermined holding power.

In applications of this type of DC solenoid to a solenoid valve or the like requiring water- and explosion-proofness, however, the thermistor 2 which is encapsulated integrally with the coil 1 by synthetic resin is so fragile and liable to develop a cracking that it is impossible to apply a high pressure thereto. Thermoplastic synthetic resins such as nylon, polybutylene terephthalate or polyphenylene sulfide cannot be used for encapsulation by injection molding. The injection molding is usually effected under pressure 30-50 Kg/cm$^2$. As a result, in conventional methods, the coil 1 and the thermistor 2 are integrally sealed by the cast molding using a thermosetting resin such as epoxy resin or polyester resin. The cast molding is usually effected without any pressure.

The cast molding by epoxy resin, however, requires a long time for setting the resin and therefore is low in productivity.

Further, the cast molding, which requires a multiplicity of dies, is high in cost, and since it is difficult to secure the accuracy of the resin-molded parts, cannot be used for integrally molding other component parts such as a connector.

SUMMARY OF THE INVENTION

The object of the present invention which has been developed in view of the aforementioned problem is to provide a DC solenoid in which a coil and a thermistor may be encapsulated integrally by injection molding process.

In order to achieve the above-mentioned object, the DC solenoid according to the present invention is characterized in that a thermistor having a positive temperature coefficient is connected to a coil, sealed integrally with the coil by a synthetic resin and is housed in a pressure-resistant case.

In this configuration, the fact that the thermistor is housed in a pressure-resistant case prevents the molding pressure from being directly applied to the thermistor and therefore prevents the thermistor from cracking. This makes it possible to encapsulate the coil and the thermistor by injection molding, thereby leading to a greatly improved productivity and cost reduction.

Also, the injection molding, which secures the accuracy of the resin-molded parts, assures the integral molding of other component parts including a connector.

BRIEF DESCRIPTION OF THE DRAWINGS

FIGS. 2 and 3 are diagrams showing a first embodiment of the present invention, in which FIG. 2 is a sectional view and FIG. 3 a sectional view taken along a dashed line III—III in FIG. 2.

FIGS. 4 and 5 are diagrams showing a second embodiment of the present invention, in which FIG. 4 is a sectional view and FIG. 5 is a sectional view taken along a dashed line V—V in FIG. 4.

DESCRIPTION OF THE PREFERRED EMBODIMENTS

Embodiments of the present invention will be described below with reference to the accompanying drawings.

Figure 1:
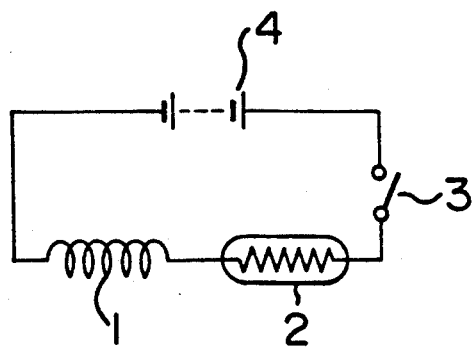
FIG. 1 is a circuit diagram showing a configuration of a conventional DC solenoid.
Figure 2:
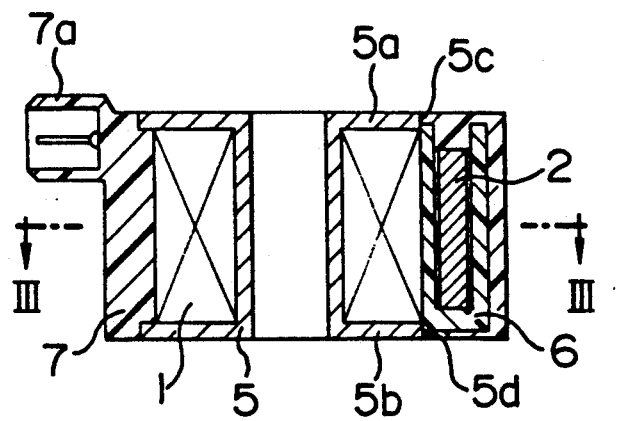

A DC solenoid according to a first embodiment of the present invention is shown in FIGS. 1 and 2. The DC solenoid according to this embodiment comprises a coil 1 wound on a bobbin 5, a thermistor 2 having a positive temperature coefficient connected in series to the coil 1, a pressure-resistant case 6 for housing the thermistor 2, a resin-molded part 7 sealed integrally with the pressure-resistant case 6 and a connector 7a integrally formed with the resin-molded part 7.

The pressure-resistant case 6 which is made of synthetic resin or metal is constructed as a box with the upper part thereof closed and has a sufficient strength to resist the deformation which otherwise might be caused under an injection molding pressure applied thereto. Also, the bobbin 5 has upper and lower flanges 5a, 5b formed with positioning notches for mounting the pressure-resistant case 6 on the bobbin 5.

After the pressure-resistant case 6 containing the thermistor 2 is assembled on the bobbin 5, the coil 1 and the pressure-resistant case 6 are integrally sealed by injection-molding the resin-molded part 7 by use of synthetic resin such as nylon, polybutylene terephthalate or polyphenyl sulfide. In the process, in spite of the fact that the injection-molding pressure is applied to the sides of the pressure-resistant case 6, the case 6 having a sufficient strength is not deformed and prevents the injection pressure from being applied directly to the thermistor 2 thereby to prevent the thermistor 2 from cracking.

According to the first embodiment, therefore, the integral encapsulation of the coil 1 and the thermistor 2 by injection molding improves the productivity greatly and reduces the production cost as compared with the conventional cast molding methods.

Also, the injection molding, which secures the accuracy of the resin-molded part 7, makes possible the integral molding of the component parts such as a connector 7a.

Figure 3:
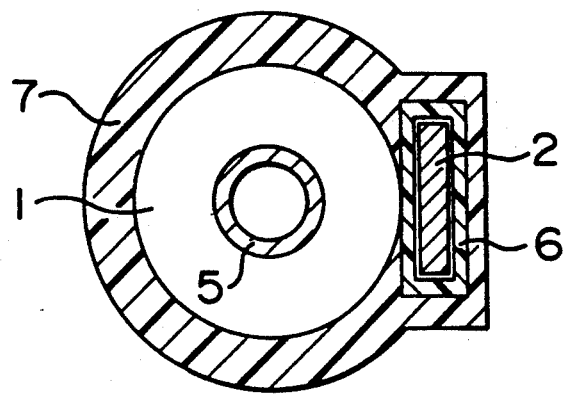
Figure 4:
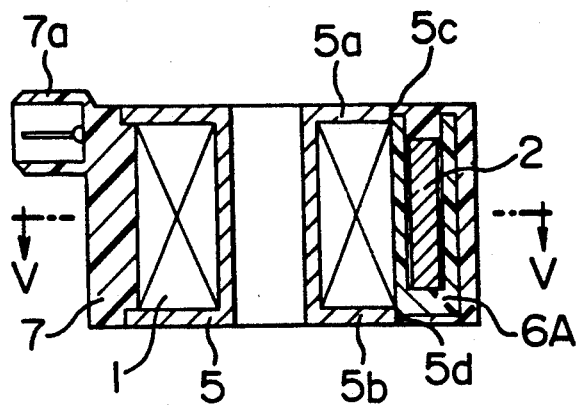

Now, a second embodiment of the present invention will be explained with reference to FIGS. 3 and 4.

According to the second embodiment, that side of a pressure-resistant case 6A which is opposed to the coil 1 is formed in an arc having the same radius as the coil 1. The other component parts which are identical to the corresponding parts of the first embodiment will be designated by the same reference numerals as the corresponding parts of the first embodiment respectively by way of explanation. According to the second embodiment, the pressure-resistant case 6A has an arcuate side and therefore is easily mountable on the bobbin 5 for an improved workability.

Further, the planar contact between the pressure-resistant case 6A and the coil 1 prevents the concentration of the injection molding pressure exerted on the coil 1 through the pressure-resistant case 6A at the time of injection molding, thus preventing the coil 1 from being deformed or damaged.

Figure 5:
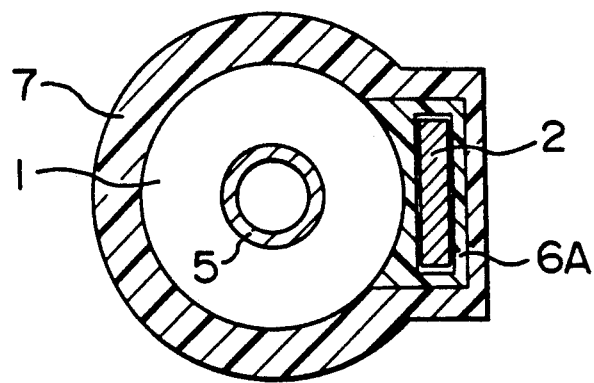
Figure 6:
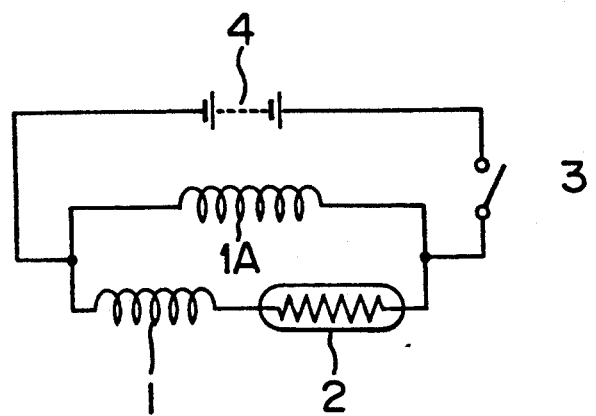
FIG. 6 is a diagram showing a circuit of the second embodiment of the present invention.

The DC solenoid according to the present invention is not limited to the circuit configuration shown in FIG. 5, but may also employ a circuit configuration shown in FIG. 6, for example. In a DC solenoid having a circuit configuration shown in FIG. 5, the temperature of the thermistor 2 which is increased to high level by energization is not immediately decreased after the main switch 3 is turned off and the thermistor 2 continues to exhibit a large resistance value. As a consequence, the required minimum operating current may fail to flow in the coil 1 and the restarting of the solenoid may be hampered at the time of restarting. If a subcoil 1A is connected in parallel to the coil 1 and the thermistor 2 as shown in FIG. 6, in contrast, the minimum operating current required for restarting flows through the sub-coil 1A even though the thermistor 2 remains high in temperature, and substantially no current flows in the coil 1. The use of the circuit configuration shown in FIG. 6, therefore, allows a large magnetic force to be generated at the time of starting the operation and prevents the burning of the coil 1 by dampening the heat generation thereof even under continued operation. It is also possible to restart before the thermistor 2 decreases in temperature.

I claim:

1. Method of assembling a DC solenoid with a thermistor, the steps comprising:
   connecting a thermistor having positive temperature coefficient in series with a coil;
   housing the thermistor in a case that is sufficiently resistant to pressure to substantially prevent damage to the thermistor on encapsulation of the case by injection molding material thereabout; and
   injection-molding a synthetic resin material to encapsulate and seal the case and the coil integrally while substantially preventing damage to the thermistor by the injection molding process.

2. The method defined in claim 1 wherein the case is made of metal.

3. The method defined in claim 1 wherein the case is made of synthetic resin material.

4. The method defined in claim 1 including:
   connecting a sub-coil in parallel with the series circuit including the coil and the thermistor; and wherein the injection-molding step encapsulates and integrally seals the sub-coil together with the case of the coil.

* * * * *